United States Patent
Igarashi

(10) Patent No.: US 7,663,276 B2
(45) Date of Patent: Feb. 16, 2010

(54) OPTICAL ENCODER DEVICE FOR SMALL-SIZED MOTOR

(75) Inventor: Kouhei Igarashi, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 173 days.

(21) Appl. No.: 12/029,707

(22) Filed: Feb. 12, 2008

(65) Prior Publication Data
US 2008/0197729 A1      Aug. 21, 2008

(30) Foreign Application Priority Data
Feb. 19, 2007   (JP) .............................. 2007-037369

(51) Int. Cl.
*H02K 11/00*   (2006.01)
(52) U.S. Cl. ................... 310/68 B; 310/67 R
(58) Field of Classification Search ............... 310/68 B, 310/67 R, 40 MM, 71, 91
See application file for complete search history.

(56) References Cited

U.S. PATENT DOCUMENTS 5,763,970 A * 6/1998 Dunning et al. ........... 310/68 B
5,866,962 A * 2/1999 Kim .......................... 310/68 B
6,249,068 B1 * 6/2001 Knopp ........................ 310/71
7,193,347 B2 * 3/2007 Tenca et al. .................... 310/91

FOREIGN PATENT DOCUMENTS

| | | |
|---|---|---|
| JP | 2003-199297 | 7/2003 |
| JP | 2006-129692 | 5/2006 |

* cited by examiner

*Primary Examiner*—Nguyen N Hanh
(74) *Attorney, Agent, or Firm*—McGlew and Tuttle, P.C.

(57) ABSTRACT

A photo sensor module includes a holder made of resin and a light-emitting element and a light-receiving element accommodated in the holder. A printed circuit board is fixed to a flat side wall portion of a motor. The resin holder has a guide portion which is formed integrally therewith and which comes into contact with an end surface and a bearing-holding portion of an end bell. The printed circuit board is fixed in a state in which the guide portion is sandwiched between the bearing-holding portion and the printed circuit board while being brought into contact with the end surface of the end bell, whereby the photo sensor module is positioned in thrust and radial directions of the motor.

7 Claims, 8 Drawing Sheets

CODE WHEEL

OPTICAL ENCODER DEVICE FOR SMALL-SIZED MOTOR

BACKGROUND OF THE INVENTION

1. Field of the Invention

The present invention relates to an optical encoder device for a small-sized motor which optically detects rotation of a motor shaft.

2. Description of the Related Art

In some cases, there arises demand for attaching, to a small-sized motor, a device for detecting the rotational speed and position of the motor. A small-sized motor equipped with an optical encoder device used as such a detection device has been used in applications which require rotation control such as automotive electrical components and OA apparatuses (e.g., a printer).

FIG. 8 illustrates a conventional technique of attaching an optical encoder device to a motor (see Japanese Patent Application Laid-Open (kokai) No. 2003-199297). As shown in FIG. 8, a pair of through holes are formed in a flat side surface (a lower surface in FIG. 8) of a motor so as to allow connection to a printed circuit board. The printed circuit board includes a pair of contact pins adapted to be inserted into the pair of through holes, as well as electronic components such as a photo sensor module and a connector.

After the contact pins are inserted into the through holes by means of pushing and moving the printed circuit board in a direction of an arrow from the lower side in the drawing, a fixing clamp is fitted onto the motor from the upper side in the drawing. That is, the fixing clamp is pushed and moved in a direction of an arrow from the side of the motor opposite the printed circuit board, and pegs of the fixing clamp are inserted into corresponding guide holes formed in the printed circuit board, whereby the printed circuit board is assembled. A code wheel is secured to a shaft end of the motor.

As described above, when the illustrated printed circuit board is employed, a motor having female terminals (through holes) on its side surface is used, and the female terminals and the printed circuit board are connected via the contact pins standing on the printed circuit board. Since the printed circuit board cannot be supported by means of contact pressure of the contact pins applied to the female terminals, an expensive metal fixing clamp is used. However, the complicated shape of the fixing clamp considerably increases cost. Since the positioning between the code wheel and the sensor is realized by a plurality of components cumulatively assembled (such as the motor and the code wheel, the clamp and the motor, the clamp and the board, and the board and the sensor), anxiety arises in relation to positioning accuracy.

In a case where a printed circuit board must be attached to a motor, the motor is typically of a type in which male terminals (motor terminals) project from the end face of an end bell, rather than the side surface of the motor, along the axial direction of the shaft (see Japanese Patent Application Laid-Open (kokai) No. 2006-129692). However, in the case of a motor having a small diameter, such as 20 mm, the male terminals hinder mounting of various components onto the board, which is restricted in dimensions. According to a known technique which can solve such a drawback, a motor of a type in which male terminals project from a side surface (flat surface) of the motor is used, and a printed circuit board is attached to the male terminals. Since the connection between the printed circuit board and the motor is established by means of soldering to the male terminals, the printed circuit board can be fixed to the motor. However, since the printed circuit board is fixed by means of soldering only, the resistance of the printed circuit board to external force is insufficient. Therefore, a thick glass epoxy board which is high in strength but expensive must be used for the printed circuit board. Even in such a case, a resultant structure cannot be said to have a sufficient degree of robustness. The positional relation between the code wheel and the photo sensor module is important. However, the conventional encoder devices do not have a portion for structurally positioning the photo sensor module. Therefore, the conventional encoder devices require external positioning performed by use of a jig or the like, and concerns arise in relation to workability and positioning accuracy.

SUMMARY OF THE INVENTION

The present invention has solved the above-described problem, and an object of the present invention is to provide an optical encoder device which is used with a flat-type motor that can support on its side surface (flat surface) a printed circuit board carrying various components even when the diameter of the motor is small, the optical encoder device being configured to increase the strengths of connection and fixation between the printed circuit board and the motor to thereby realize a sufficient degree of structural robustness, and to enable a photo sensor module to be reliably positioned and fixed in relation to a code wheel, without requiring external positioning by use of a jig or the like. This configuration allows accurate positioning of the code wheel and the photo sensor module, which positioning is realized by a plurality of cumulatively assembled components, even in a case where an inexpensive printed circuit board is used.

An optical encoder device for a small-sized motor according to the present invention comprises a code wheel attached to a motor shaft extending outward from a motor via a bearing accommodated within a bearing-holding portion of an end bell of the motor; and a printed circuit board including a photo sensor module attached thereto such that an optical modulation track portion of the code wheel is positioned in a gap of the photo sensor module, wherein the photo sensor module includes a holder made of resin and a light-emitting element and a light-receiving element accommodated in the holder. The printed circuit board is fixed to a flat side wall portion of the motor. The holder has a guide portion which is formed integrally with the holder to project from the holder and comes into contact with an end surface of the end bell and the bearing-holding portion. The printed circuit board is fixed in a state in which the guide portion is sandwiched between the bearing-holding portion and the printed circuit board while being brought into contact with the end surface of the end bell, whereby the photo sensor module is positioned in thrust and radial directions of the motor.

The fixation of the printed circuit board to the side wall portion of the motor is performed by soldering a pair of motor terminals, projecting from the side wall portion of the motor, to a printed wiring portion on the back surface of the printed circuit board. A terminal block formed integrally with the end bell and surrounding the pair of motor terminals is fitted into a hole formed in the printed circuit board, whereby the printed circuit board is positioned in relation to the motor. The pair of motor terminals are bent on the back surface side of a single-sided printed circuit board formed of phenol resin and having a printed wiring portion on the back surface only, and are soldered to the printed wiring portion. The photo sensor module is positioned by inserting a plurality of bosses formed on a bottom surface of the holder into corresponding holes or notches formed in the printed circuit board. The guide portion projects from the holder in a perpendicular direction so as to form an L-like shape. The guide has a round surface which has a shape corresponding to a circular shape of a side surface of the bearing-holding portion and which is brought into contact with the side surface of the bearing-holding portion.

According to the present invention, there is provided an improved optical encoder device for a flat-type motor that can support on its flat side surface a printed circuit board carrying various components even when the diameter of the motor is small. The optical encoder device can increase the strengths of connection and fixation between the printed circuit board and the motor to thereby realize a sufficient degree of structural robustness, and to enable a photo sensor module to be reliably positioned and fixed in relation to a code wheel, without requiring external positioning by use of a jig or the like. Since the positioning of the code wheel and the photo sensor module can be performed by use of a single part; i.e., the guide portion provided on the photo sensor module and using the surface of the motor end bell as a reference, high positioning accuracy is attained. This allows accurate positioning of the code wheel and the photo sensor module between which a plurality of components are cumulatively assembled, even when an inexpensive thin printed circuit board (single-sided phenol board) is used.

BRIEF DESCRIPTION OF THE DRAWINGS

FIGS. 6A and 6B are views of the printed circuit board carrying the photo sensor module attached thereto, wherein FIG. 6A shows a front surface side of the printed circuit board (side on which components are attached), and FIG. 6B shows a back surface side of the printed circuit board (side on which a printed wiring is present);

DESCRIPTION OF THE PREFERRED EMBODIMENT

Figure 1A:
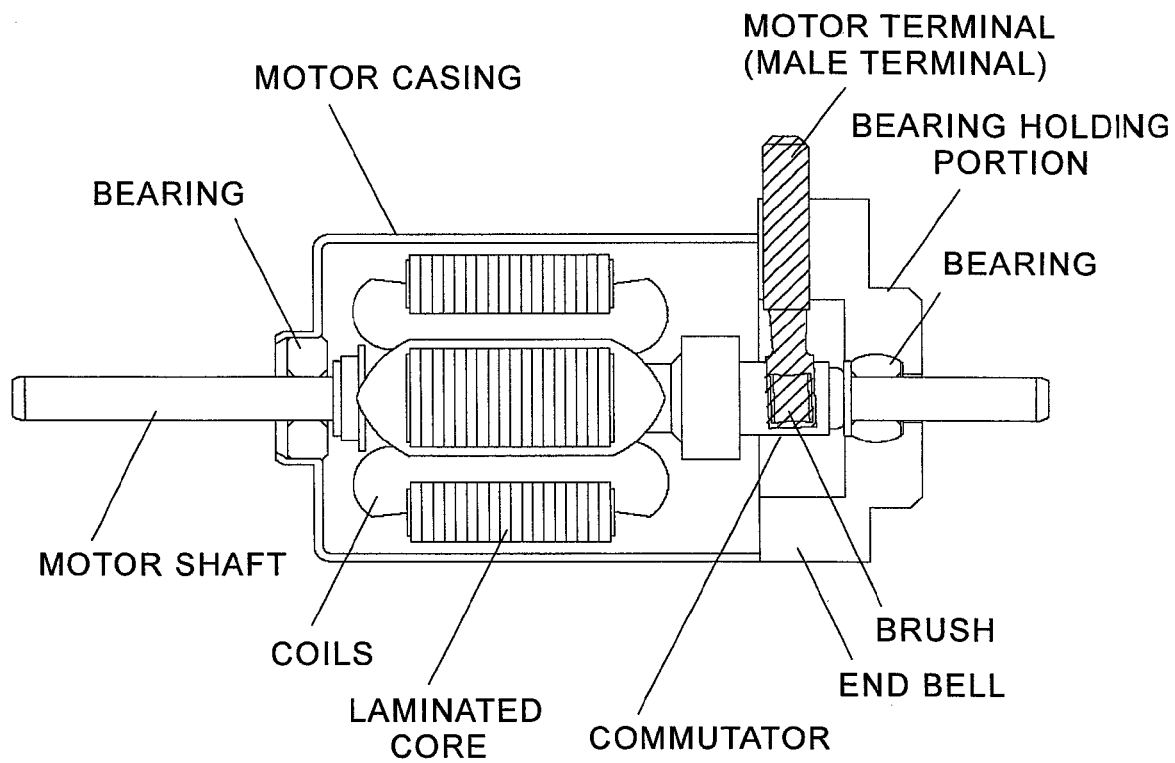
FIG. 1A is a sectional view of a motor alone, oriented such that a flat surface from which motor terminals (male terminals) project faces upward in the drawing.
Figure 1B:
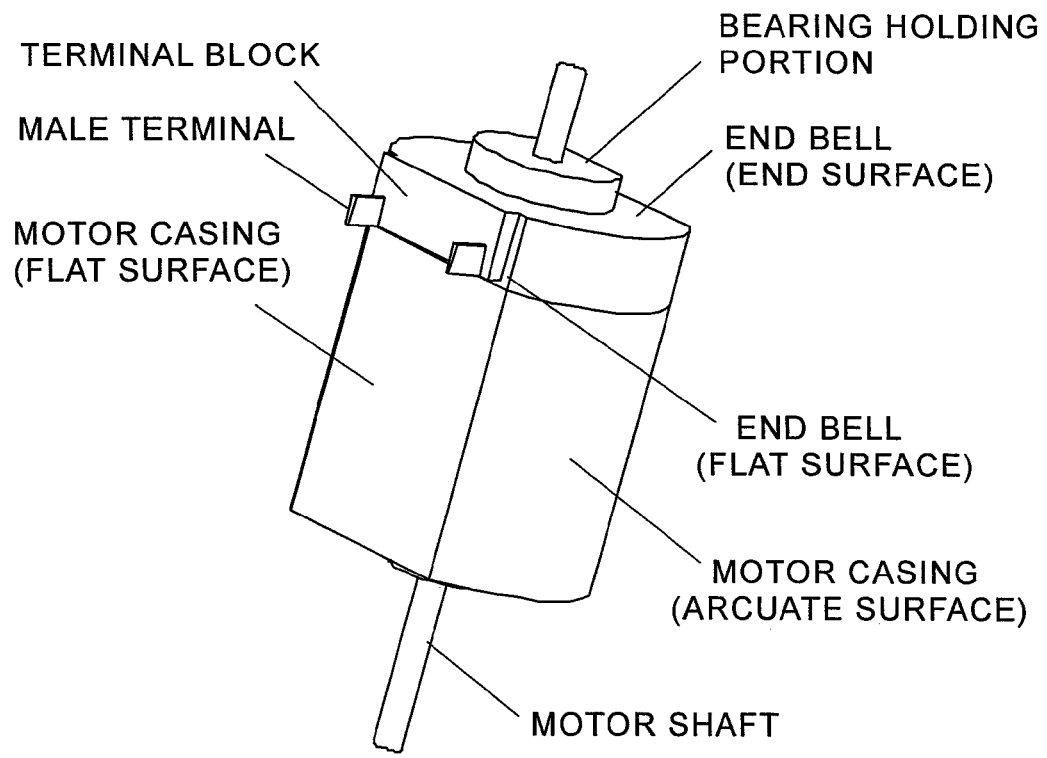
FIG. 1B is a perspective view of the motor as viewed from the outer side of the motor.

The present invention will now be described by way of example. FIG. 1A is a sectional view of a motor alone, oriented such that a flat surface from which motor terminals (male terminals) project faces upward in the drawing; and FIG. 1B is a perspective view of the motor as viewed from the outside of the motor. A pair of magnets, serving as stator magnetic poles, are attached to inner surfaces of arcuate wall portions of a motor casing made of a metal. A rotor is rotatably attached to the motor casing. The rotor is constructed by integrally assembling onto a motor shaft a commutator and rotor magnetic poles that are formed by a laminated core and coils. The motor casing has flat wall portions (flat surfaces) on opposite sides and arcuate wall portions extending between the flat wall portions, so that the motor casing has a bottomed hollow tubular shape as a whole. After the rotor integrally assembled onto the motor shaft is inserted into the motor casing through its opening, an end bell made of a resin (e.g., polyamide) is attached to the motor casing to close the opening thereof. This end bell has a cylindrical circumferential wall which has flat wall portions (flat surfaces) on opposite sides as in the case of the motor casing, and an end wall integrally formed with the cylindrical circumferential wall such that the end wall closes one end of the cylindrical circumferential wall of the end bell. The end bell end wall means a wall through which the motor shaft penetrates and which is perpendicular to the motor shaft, and includes an integrally formed bearing holding portion as illustrated. One of the opposite flat wall portions of the end bell has a terminal block formed integrally with the end bell such that the terminal block surrounds a pair of male terminals and projects from the corresponding flat wall portion. As will be described later, this terminal block is fitted into a terminal-block-receiving rectangular hole (FIG. 5) formed in a printed circuit board.

The motor shaft is rotatably supported by means of a bearing located at the center of a bottom portion of the motor casing and a bearing located at the center of the end bell. The end-bell side bearing is accommodated within the bearing-holding portion formed integrally with the end bell. A pair of brushes in contact with the commutator are electrically connected to a pair of motor terminals (male terminals) projecting outward from the corresponding flat wall portion of the end bell. Electrical power is externally supplied to the motor terminals. The above-described structure of the small-sized motor itself is an ordinary one.

Figure 2:
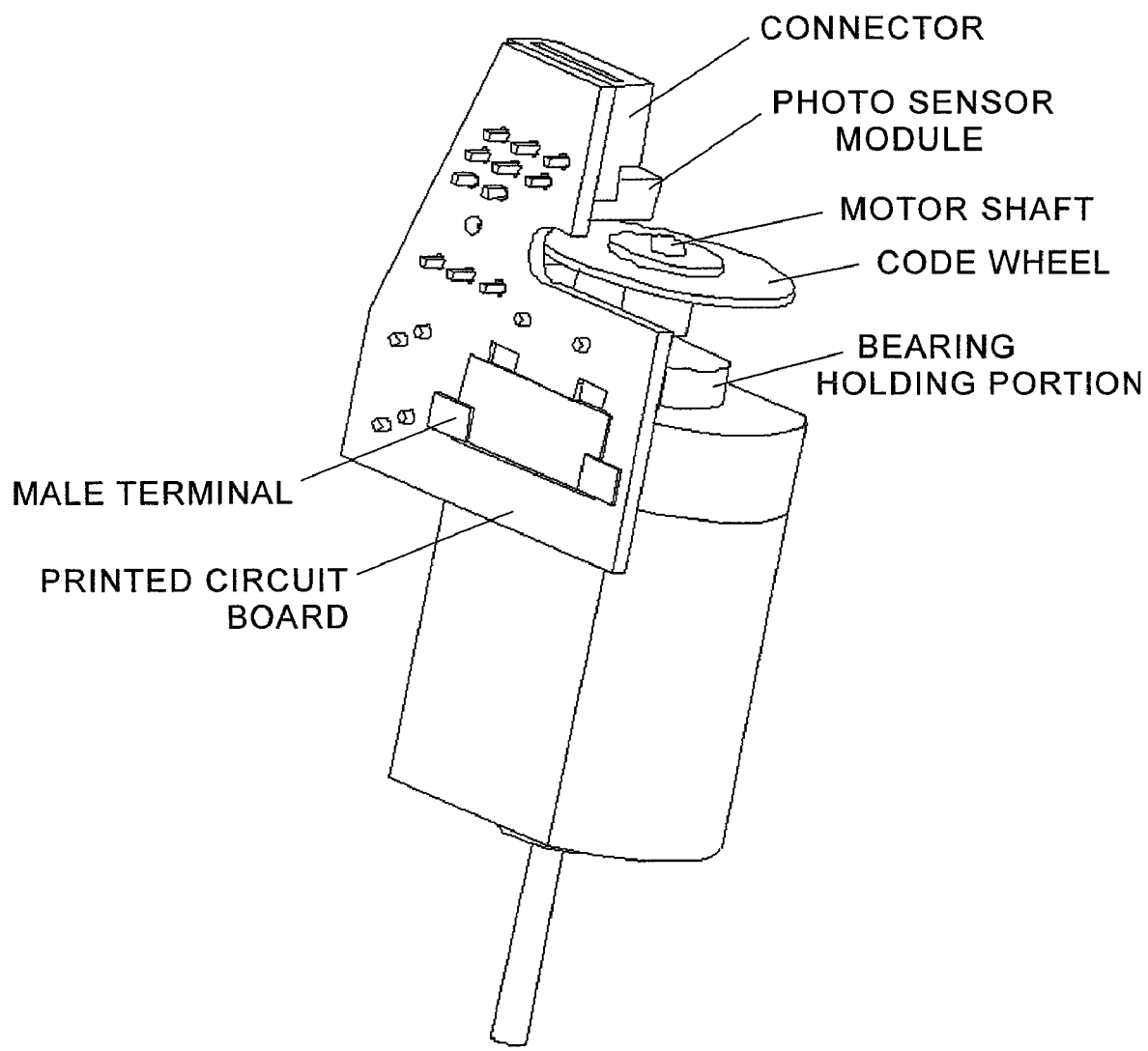
FIG. 2 is a perspective view showing a state after an encoder device is fixed to the motor to thereby complete assembly.

FIG. 2 is a perspective view showing a state after an encoder device is fixed to the motor to thereby complete assembly. Notably, in order to simplify the illustration, soldering on the back side of the printed circuit board is not shown. As shown in FIG. 2, a single-sided printed circuit board having a printed wiring portion (not shown) on the back surface only is fixed to the motor. The male terminals of the motor are shown in a state in which the male terminals are bent on the back surface side of the printed circuit board. However, in a later stage the male terminals are soldered to the printed circuit board for electrical and mechanical connection. Circuit components such as a photo sensor module and a connector are attached to the front surface of the printed circuit board. The photo sensor module includes a light-receiving element and a light-emitting element integrally assembled to a photo sensor module holder. Further, a code wheel is attached to a portion of the motor shaft, which portion extends outward from the end bell of the motor. The code wheel is attached to the motor shaft along the axial direction of the shaft such that an optical modulation track portion of the code wheel is positioned in a gap between the opposed light-emitting and light-receiving elements of the photo sensor module. The code wheel and the printed circuit board carrying various circuit components attached thereto constitute an optical encoder device for detecting rotational speed and position of the motor. The present invention is characterized by the shape of the photo sensor module holder, and connection and fixation of the printed circuit board to the motor after attachment of the photo sensor module holder to the printed circuit board. These characteristic features will now be described with reference to detailed views showing relevant portions.

Figure 3A:
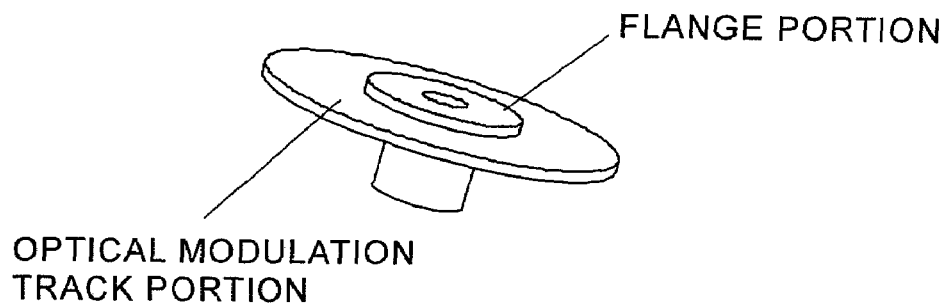
FIG. 3A is a perspective view of a code wheel alone.
Figure 3B:
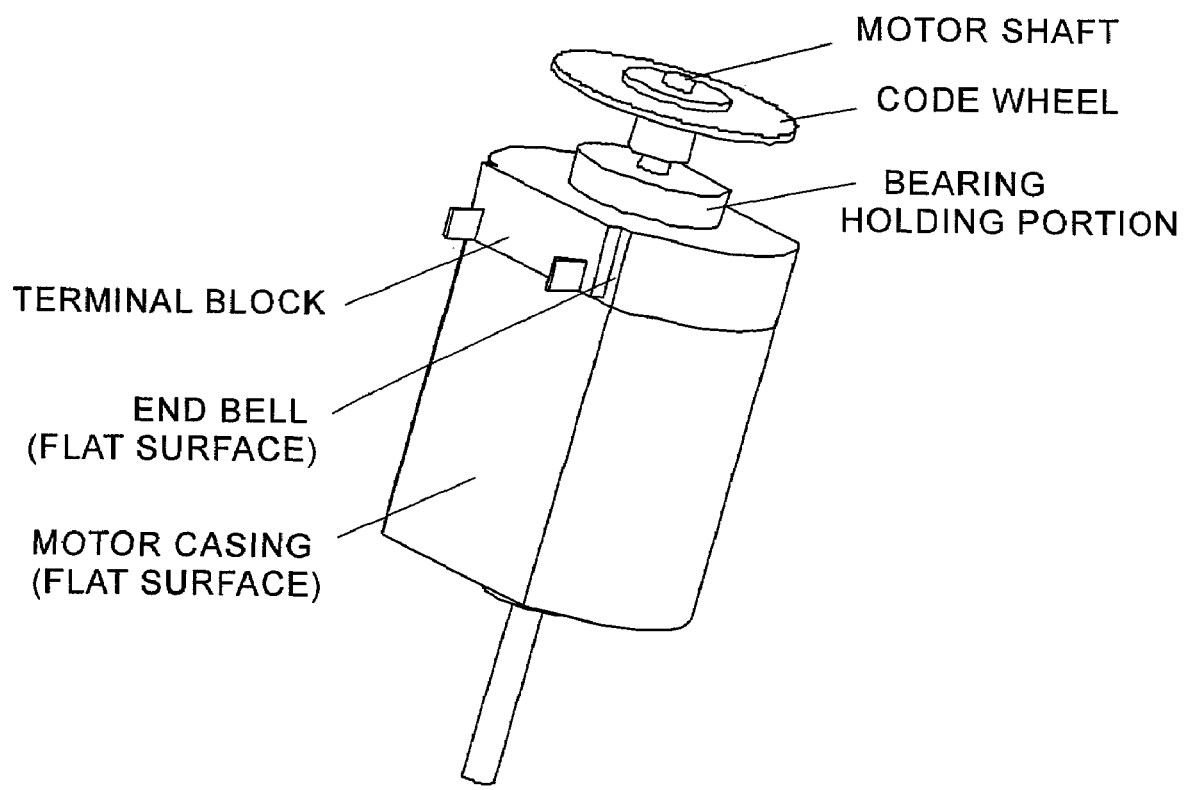
FIG. 3B is a perspective view of the motor with the code wheel attached to a motor shaft.

FIG. 3A is a perspective view of the code wheel alone; and FIG. 3B is a perspective view of the motor with the code wheel attached to the motor shaft. The code wheel is attached to the motor along the axial direction of the motor shaft, and then fixed thereto. The code wheel itself is an ordinary one, and can be fixed in an ordinary manner. The illustrated code wheel is composed of a central flange portion and an optical modulation track portion fixed to the circumference of the flange portion. The flange portion is positioned and fixed, through press-fitting or the like, to an extension portion of the motor shaft extending outward of the end bell from the bearing holding portion. In the case where the flange portion is press-fitted, the flange portion is preferably formed from a resin. Alternatively, in consideration of strength, the flange portion may be formed of iron or brass. The optical modulation track portion includes an optical modulation track in which a plurality of slits are provided at constant intervals along the circumferential direction and which allows generation of about 50 pulses/revolution with rotation of the motor shaft. Passage of light emitted on one side of the rotating optical modulation track portion and received on the other side thereof is permitted by slit portions of the rotating optical modulation track portion and is prohibited by non-slit portions thereof, whereby the rotational speed and position can be detected.

Figure 4A:
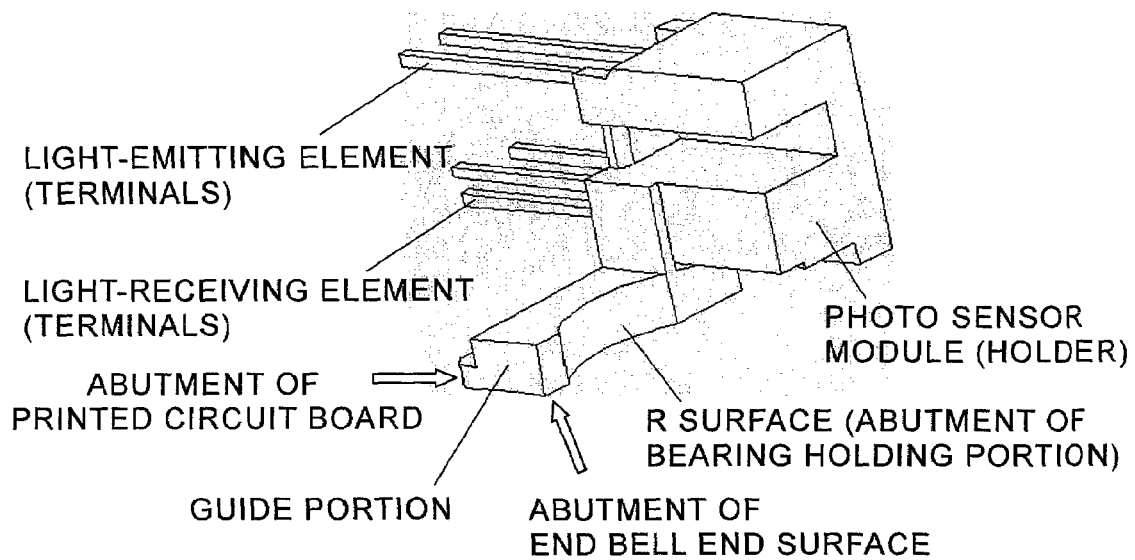
FIGS. 4A and 4B are views showing the external appearance of a photo sensor module as viewed from different directions.
Figure 4B:
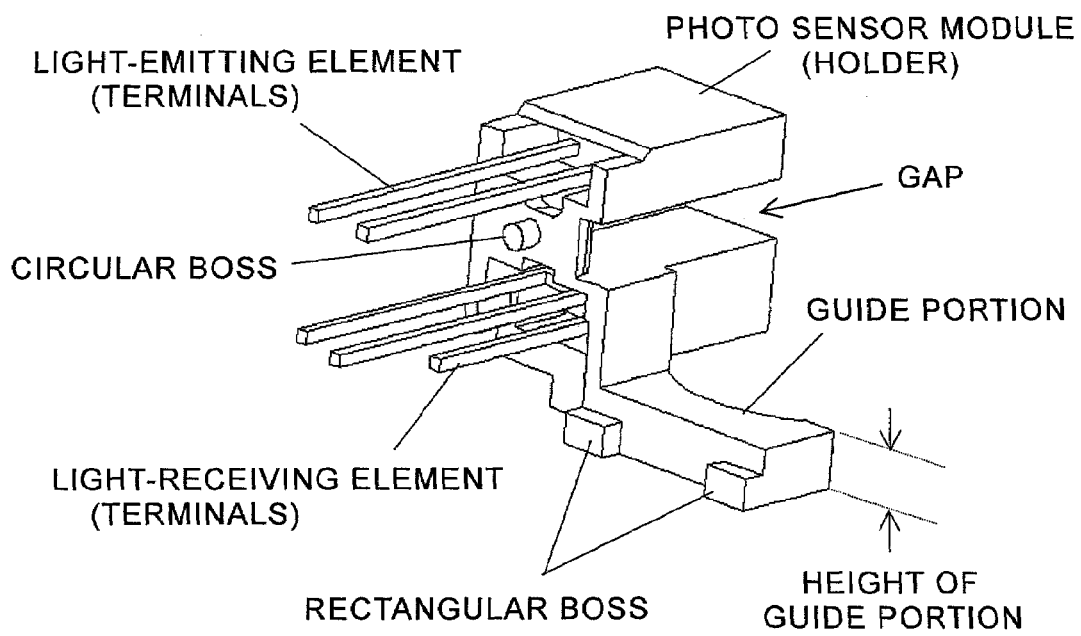

FIGS. 4A and 4B are views showing the external appearance of the photo sensor module as viewed from different directions. The photo sensor module is composed of a holder formed of a resin, and a light-emitting element and a light-receiving element accommodated in place within the holder. The holder of the photo sensor module is integrally formed from a resin (e.g., polycarbonate) through injection molding, and has recesses for arranging the light-emitting element and the light-receiving element in the holder such that they face each other. The recesses for receiving and positioning the light-emitting and light-receiving elements are configured such that three wall surfaces of each recess have a plurality (2×3 surfaces=6 in total) of ribs for preventing coming off of the corresponding element, and the element is pressed against the remaining wall surface. At a gap portion of the photo sensor module holder accommodating the light-emitting and light-receiving elements, the holder has holes or grooves (not shown) through which a light-emitting portion of the light-emitting element and a light-receiving portion of the light-receiving element face each other, so that a photo diode (the light-receiving element) can receive infrared light emitted from an infrared LED (the light-emitting element). Since the holder is formed of polycarbonate (black) that can block infrared light, the holder can suppress entry of irregularly reflected infrared light into the light-receiving element.

The optical modulation track portion of the code wheel is positioned and disposed in the gap of the photo sensor module. The respective terminals of the light-emitting element and the light-receiving element are inserted into terminal-receiving holes of the printed circuit board and are soldered for fixation. Notably, the illustrated light-receiving element has three terminals, because the light-receiving element is configured such that two photo diodes are connected so as to detect signals having a phase shift therebetween to thereby detect not only rotational speed but also the direction of rotation of the motor.

The illustrated photo sensor module has an L-shaped projecting portion (guide portion) formed integrally with the resin holder, and a plurality of bosses (one circular boss between the light-emitting element and the light-receiving element, and two rectangular bosses on the back surface of the guide portion) on a surface (bottom surface) of the photo sensor module with which the printed circuit board comes into contact. The reason why the guide portion is projected to form an L-like shape; i.e., in a direction perpendicular to the holder body, is to increase positioning accuracy. The height of the guide portion (FIG. 4B) is desirably determined to be generally equal to the height of the bearing-holding portion with respect to the thrust direction. Further, the projection length of the guide portion is desirably determined such that the guide portion has a sufficient length for coming into contact with the bearing holding portion but does not project from the end surface of the end bell. In the case of the photo sensor module shown in FIGS. 4A and 4B, the printed circuit board comes into contact with the photo sensor module from the left side of FIG. 4A, and the end surface of the end bell comes into contact with the photo sensor module from the lower side of FIG. 4A. Further, an R (round) surface for contact with a cylindrical side surface of the bearing holding portion is formed on the side of the guide portion opposite the surface which comes into contact with the printed circuit board.

Figure 5A:
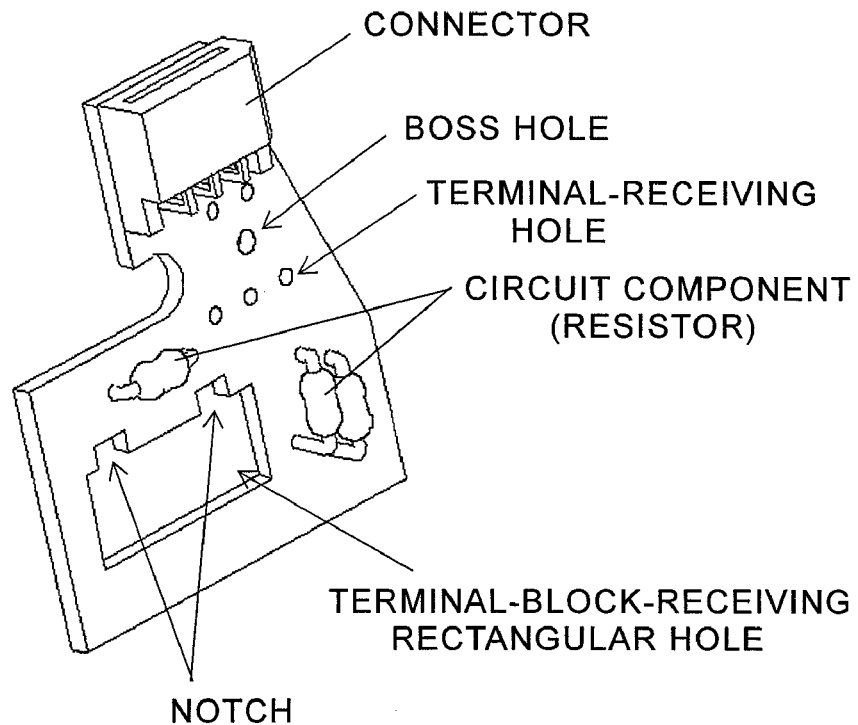
FIGS. 5A and 5B are views of a printed circuit board before attachment of the photo sensor module thereto as viewed from different directions.
Figure 5B:
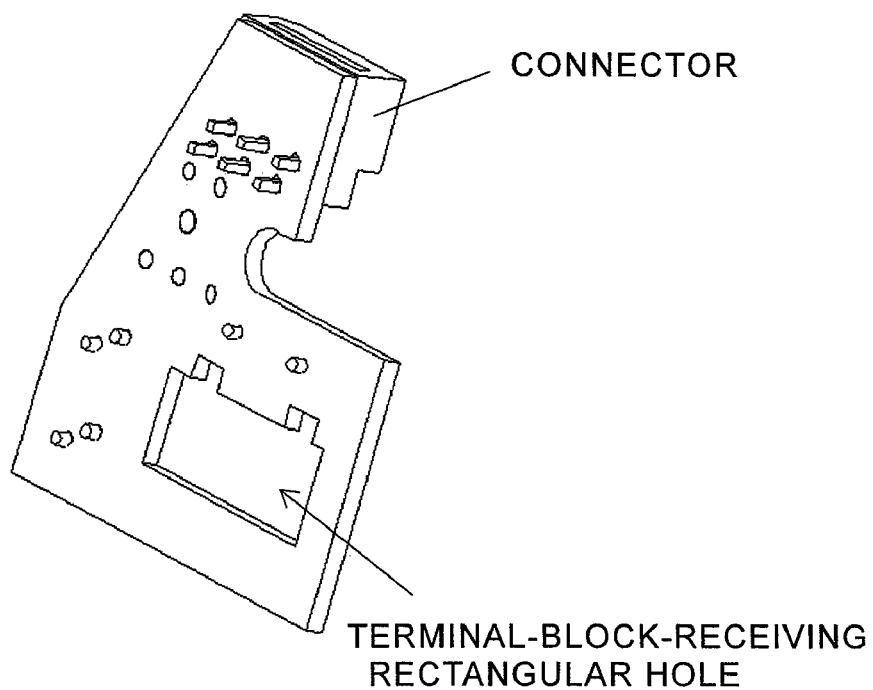

FIGS. 5A and 5B are views showing the printed circuit board before attachment of the photo sensor module thereto as viewed from different directions. Components such as resistors and a connector are attached to the front surface (the component mounting side) of the illustrated printed circuit board. Electrical terminals of the components are caused to penetrate through corresponding holes provided in the printed circuit board and project from the back surface thereof, and are soldered and fixed to a printed wiring portion (not shown) formed on the back surface. This printed circuit board has a terminal-block-receiving rectangular hole which receives the terminal block provided on the flat wall portion of the end bell. Further, two notches are formed along a longer side of the terminal-block-receiving rectangular hole, and the (two) rectangular bosses provided on the bottom surface of the guide portion of the photo sensor module are fitted into the notches. The printed circuit board desirably has a thickness t (e.g., 1.2 mm) corresponding to the height of the terminal block of the end bell.

Figure 6A:
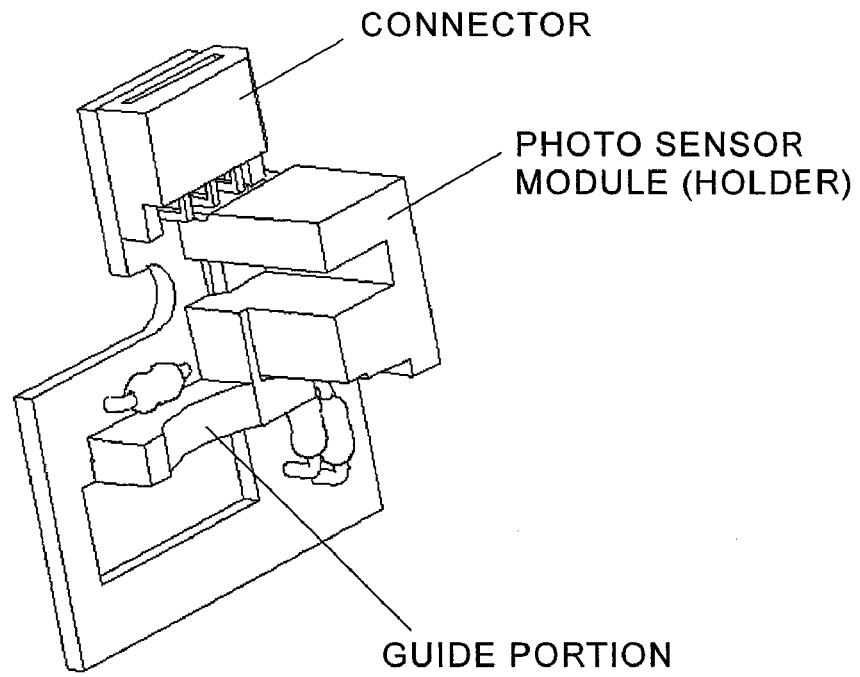
Figure 6B:
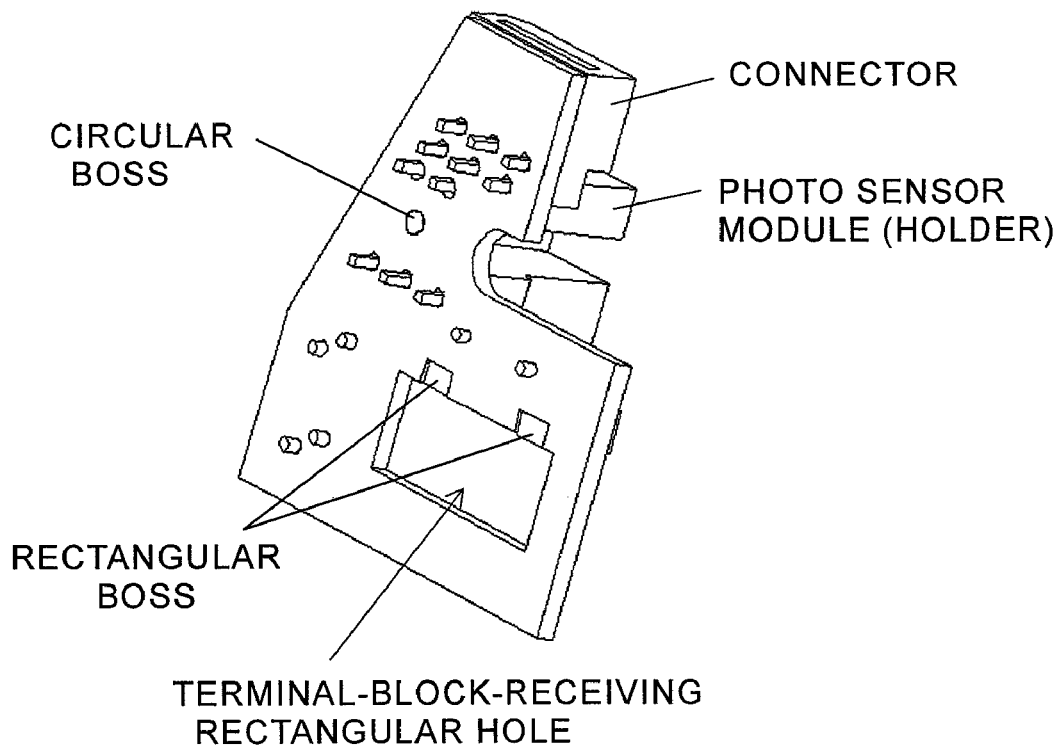

FIGS. 6A and 6B are views of the printed circuit board carrying the photo sensor module attached thereto, wherein FIG. 6A shows the front surface side of the printed circuit board (the component mounting side), and FIG. 6B shows the back surface side of the printed circuit board (the side on which a printed wiring is present). The photo sensor module is attached to and positioned in relation to the printed circuit board (FIG. 5) including components such as resistors and a connector mounted onto the front surface side (the component-mounting side). Electrical terminals of the photo sensor module are caused to penetrate through corresponding holes provided in the printed circuit board and project from the back surface thereof. At that time, the circular bosses and the two rectangular bosses on the bottom surface of the photo sensor module are fitted into the corresponding boss hole and (two) notches of the printed circuit board, whereby the photo sensor module is positioned. Subsequently, the electrical terminals are soldered and fixed to the printed wiring (copper foil pattern) portion on the back surface of the board. Power lines and signal lines extending from the photo sensor module are led to the outside of the printed circuit board via the printed wiring and the connector.

Figure 7A:
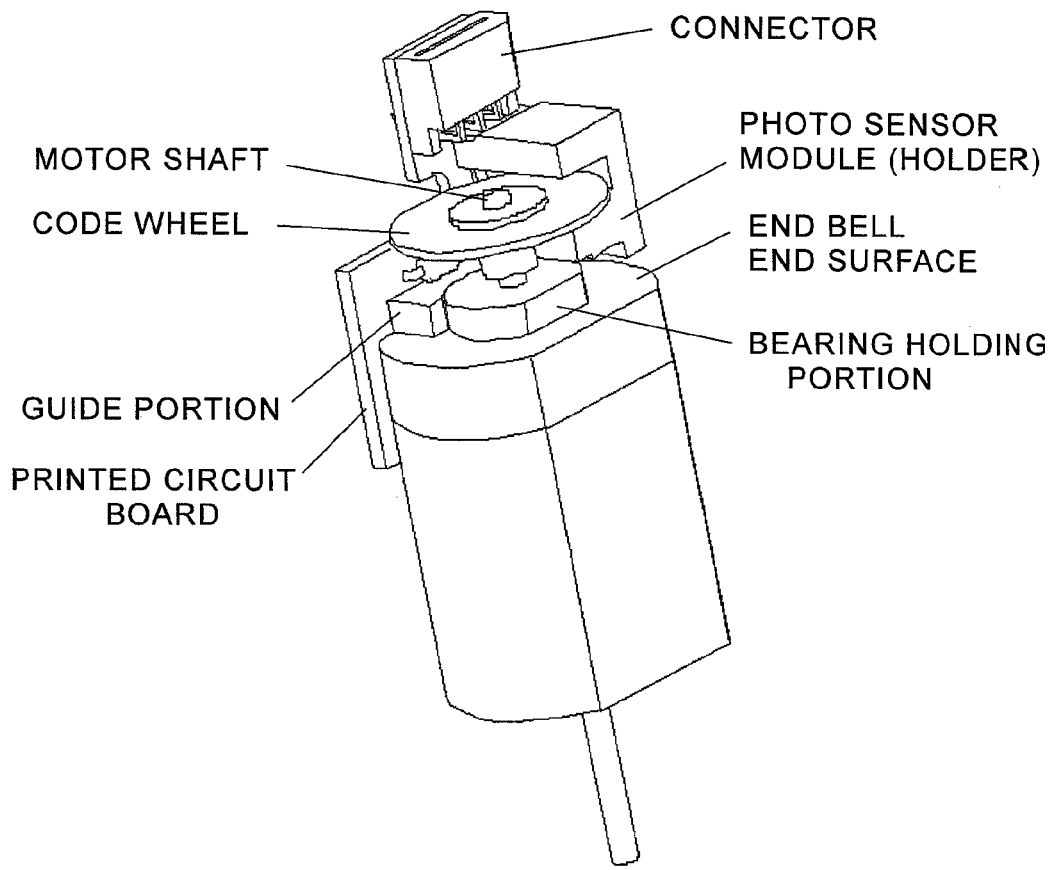
FIG. 7A is a perspective view showing attachment of the printed circuit board to the motor.
Figure 7B:
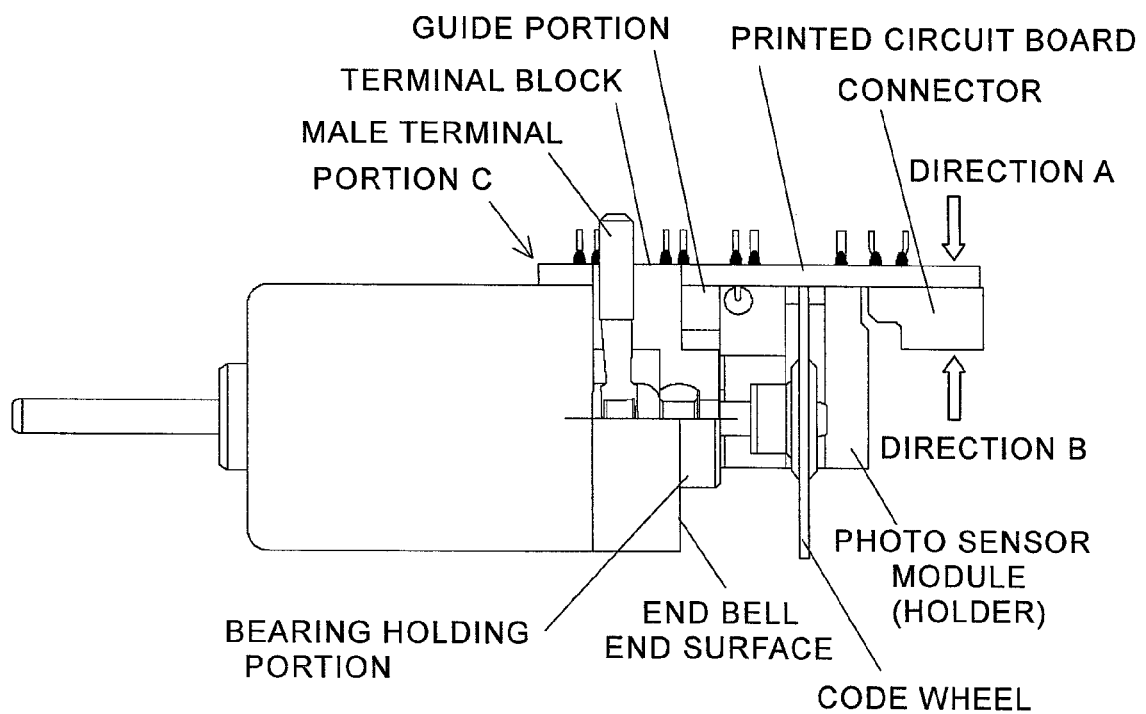
FIG. 7B is a partially sectional side view showing attachment of the printed circuit board to the motor.
Figure 8:
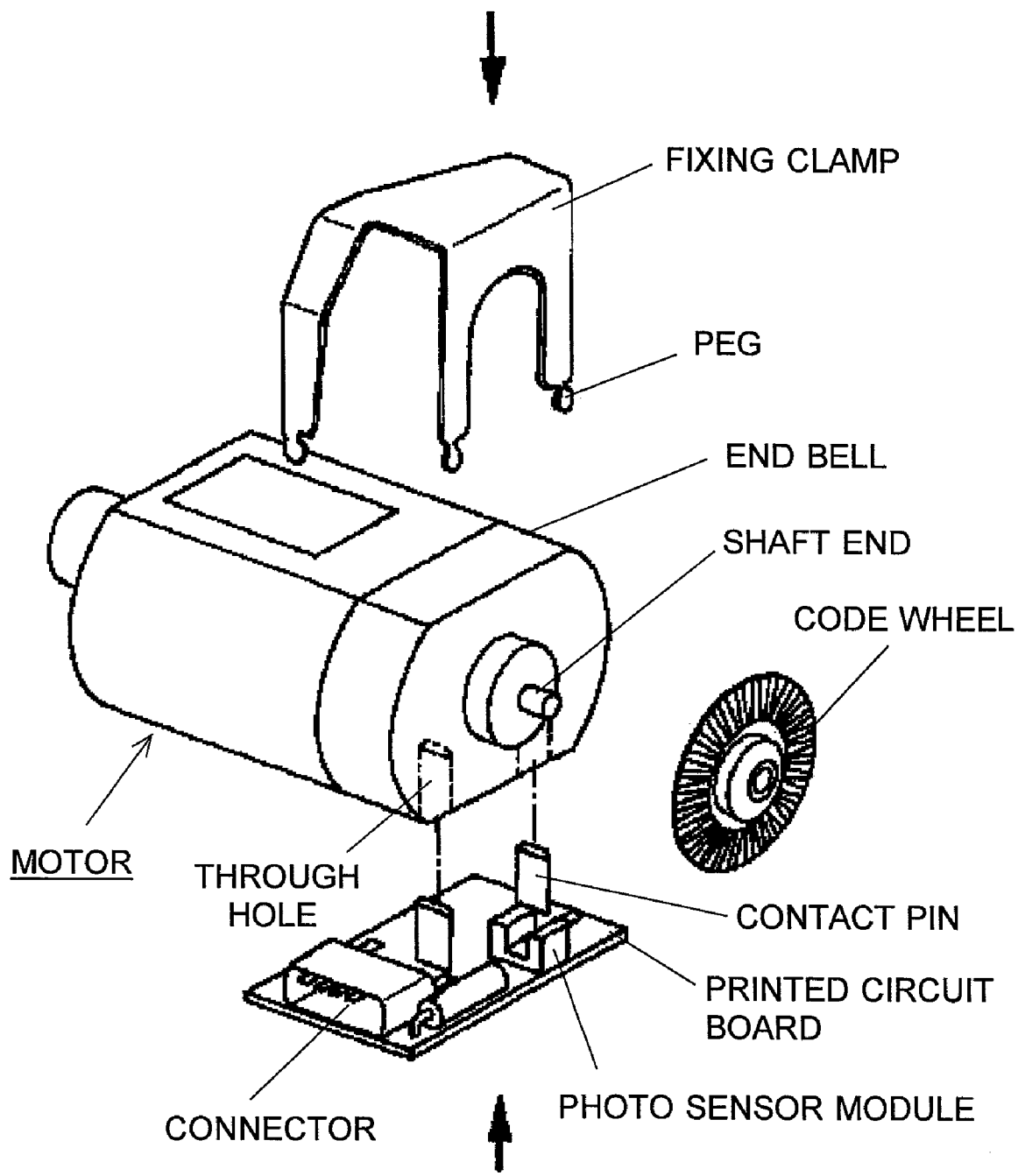
FIG. 8 is a view showing a conventional technique of attaching an optical encoder device to a motor.

FIG. 7A is a perspective view showing attachment of the printed circuit board to the motor; and FIG. 7B is a partially sectional side view showing attachment of the printed circuit board to the motor. The printed circuit board (FIG. 6) to which various circuit components are connected and fixed is mounted to one flat wall portion (FIG. 3) of the motor with the code wheel secured to the motor shaft. The illustrated printed circuit board extends over not only the corresponding flat surface of the end bell but also the corresponding flat surface of the motor casing (portion C). This printed circuit board is attached to the motor in such a manner that the terminal block of the end bell, which is formed to surround the paired male terminals and projects from the flat surface, is fitted into the terminal-block-receiving rectangular hole of the printed circuit board, and the L-shaped projection portion (guide portion) integral with the photo sensor module holder comes into contact with the end surface of the end bell and the bearing-holding portion. Thus, the printed circuit board (and accordingly, the photo sensor module) is positioned in the thrust direction (the axial direction of the motor) and in the radial direction of the motor. That is, since the guide portion, which is a portion of the photo sensor module holder, comes into contact with the end surface of the end bell and the bearing-holding portion along two directions orthogonal each other, the photo sensor module is positioned in relation to the motor via the guide portion. After that, in order to establish connection between the printed circuit board and the motor, the male terminals are bent in the opposite outward direction onto the printed circuit board (see FIG. 2), and are soldered to the printed wiring portion. Thus, assembly of the encoder device to the motor is completed. As described above, the printed circuit board is fitted onto the terminal block of the end bell, and the male terminals of the motor are bent outward, whereby the thickness (the length in the vertical direction in FIG. 7B) of the encoder device can be reduced. Further, through outwardly bending the motor terminals, the printed circuit board can be fixed provisionally, whereby workability is improved. The positioning between the photo sensor module and the printed circuit board can be structurally established through mutual fitting of board guide portions (bosses and corresponding boss holes and notches) provided on the photo sensor module and the printed circuit board, respectively.

As described above, positioning of the photo sensor module is effected in the thrust and radial directions of the motor. That is, by means of bringing the guide portion into contact with the end surface of the end bell, the photo sensor module is positioned in the thrust direction of the motor. Further, by means of fixing the printed circuit board in a state where the guide portion is sandwiched between the bearing-holding portion and the printed circuit board such that the R (round) surface of the guide portion comes into close contact with a round (R) portion of the bearing-holding portion, the photo sensor module is positioned in the radial direction of the motor. The illustrated structure not only allows such positioning in the thrust and radial directions but also has robustness against external forces acting on the printed circuit board. That is, since the guide portion is sandwiched between the printed circuit board and the bearing-holding portion, the guide portion serves as a support for an external force which acts on the printed circuit board in a direction A (FIG. 7B). Meanwhile, an end portion (portion C) of the printed circuit board in contact with the motor casing serves as a support, so that the illustrated structure also has a sufficient degree of robustness against an external force acting in a direction B. Therefore, the printed circuit board itself is not required to have a large mechanical strength. In addition, soldering for components is required to be performed only one side of the printed circuit board. Accordingly, an inexpensive single-sided printed circuit board which is low in strength (e.g., a thin phenol resin board (t=1.2 mm)) can be used. Moreover, since soldering is performed only on the back side of the board, the printed circuit board serves as a wall and prevents adhesion of flux and solder grains to the sensor module and the circuit components, the flux and solder grains being generated during soldering work.

What is claimed is:

1. An optical encoder device for a small-sized motor comprising a code wheel attached to a motor shaft extending outward from a motor via a bearing accommodated within a bearing-holding portion of an end bell of the motor; and a printed circuit board including a photo sensor module attached thereto such that an optical modulation track portion of the code wheel is positioned in a gap of the photo sensor module, the photo sensor module including a holder made of resin and a light-emitting element and a light-receiving element accommodated in the holder, wherein
the printed circuit board is fixed to a flat side wall portion of the motor;
the holder has a guide portion which is formed integrally with the holder to project from the holder and comes into contact with an end surface of the end bell and the bearing-holding portion; and
the printed circuit board is fixed in a state in which the guide portion is sandwiched between the bearing-holding portion and the printed circuit board while being brought into contact with the end surface of the end bell, whereby the photo sensor module is positioned in thrust and radial directions of the motor.

2. An optical encoder device for a small-sized motor according to claim 1, wherein the fixation of the printed circuit board to the side wall portion of the motor is performed by soldering a pair of motor terminals, projecting from the side wall portion of the motor, to a printed wiring portion on a back surface of the printed circuit board.

3. An optical encoder device for a small-sized motor according to claim 2, wherein a terminal block formed integrally with the end bell and surrounding the pair of motor terminals is fitted into a hole formed in the printed circuit board, whereby the printed circuit board is positioned in relation to the motor.

4. An optical encoder device for a small-sized motor according to claim 3, wherein the pair of motor terminals are bent on the back surface side of a single-sided printed circuit board formed of phenol resin and having a printed wiring portion on the back surface only, and are soldered to the printed wiring portion.

5. An optical encoder device for a small-sized motor according to claim 1, wherein the photo sensor module is positioned by inserting a plurality of bosses formed on a bottom surface of the holder into corresponding holes or notches formed in the printed circuit board.

6. An optical encoder device for a small-sized motor according to claim 1, wherein the guide portion projects from the holder in a perpendicular direction so as to form an L-like shape.

7. An optical encoder device for a small-sized motor according to claim 1, wherein the guide has a round surface which has a shape corresponding to a circular shape of a side surface of the bearing-holding portion and which is brought into contact with the side surface of the bearing-holding portion.

* * * * *